(12) United States Patent
Lee et al.

(10) Patent No.: US 6,366,656 B1
(45) Date of Patent: Apr. 2, 2002

(54) METHOD AND APPARATUS FOR MIGRATING EMBEDDED PBX SYSTEM TO PERSONAL COMPUTER

(75) Inventors: Gordon Lee, Kanata; Dino Canton, Nepean, both of (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/302,881

(22) Filed: Apr. 30, 1999

(30) Foreign Application Priority Data

Jan. 5, 1998 (CA) .......................................... 2236525

(51) Int. Cl.[7] ................................................ H04N 3/00
(52) U.S. Cl. ................ 379/198; 379/202.01; 379/88.07
(58) Field of Search .......................... 379/88.07, 88.17, 379/198, 202.01, 225

(56) References Cited

U.S. PATENT DOCUMENTS

| 5,649,005 | A | | 7/1997 | Lynch et al. | |
|---|---|---|---|---|---|
| 5,757,898 | A | * | 5/1998 | Nishikawa | 379/93.14 X |
| 5,881,135 | A | * | 3/1999 | Watts et al. | 379/88.02 |
| 6,226,287 | B1 | * | 5/2001 | Brady | 379/93.09 X |
| 6,298,449 | B1 | * | 10/2001 | Carter | |
| 6,308,062 | B1 | * | 10/2001 | Chien et al. | 455/420 |

* cited by examiner

*Primary Examiner*—Creighton Smith
(74) *Attorney, Agent, or Firm*—Keating & Bennett, LLP

(57) ABSTRACT

A PC-based PBX incorporating preexisting call control software designed to operate in a computing environment which is not PC-based. The PC-based PBX comprises a PC chassis; a PC motherboard within the chassis; a main PBX control card within the chassis for executing the preexisting call control software; a telecommunications card within the chassis and connected to the PBX main control card for implementing telephony communications with a public switched telephone network under control of the call control software; and a DSP card within the chassis and connected to the PBX main control card for implementing signaling and conferencing functions under control of the call control software.

7 Claims, 15 Drawing Sheets

METHOD AND APPARATUS FOR MIGRATING EMBEDDED PBX SYSTEM TO PERSONAL COMPUTER

FIELD OF THE INVENTION

The present invention relates in general to computer telephony integration (CTI), and more particularly to a method and apparatus for migrating existing PBX software and hardware to a personal computer (PC).

BACKGROUND OF THE INVENTION

Traditional PBXs (private branch exchanges) arc comprises of proprietary if hardware and software enclosed within a cabinet. Prior art PBXs have proven to be invaluable in providing sophisficated call control and messaging functionality between local and remote subscribers. However, recent advances in the field of CTI have given rise to the need for such prior art PBXs to more easily support third party applications. For example, in most prior art PBXs, additional applications such as ISDN access, CTI support, recorded announcement devices (RADs), call accounting and voice mail can only be supported by adding additional external PCs, interface hardware and software.

The telecommunications industry has recognized the desirability of minimizing the complexity and cost of implementing additional applications on prior art PBXs in the manner described above. The ideal solution to the foregoing problem is seen to be full implementation of PBX functionality on a PC platform. However, a significant obstacle in realizing the objective of full PC implementation of PBX functionality is the difficulty in migrating the existing software and architectures from their traditional proprietary stand-alone environment to an exclusively PC-implemented environment. Specifically, the industry has recognized the desirability of avoiding redevelopment of existing call control software and the desirability of reusing such existing software in order to speed development and leverage existing call control functionality. It is recognized that a PC-based PBX such as described above, would retain the strengths of traditional PBX systems (e.g. fiber connectivity to peripherals, hot swapability of line cards, feature richness, networking, etc.) and provide a much more open environment for the integration of applications than is possible with such prior art PBX systems.

SUMMARY OF THE INVENTION

According to the present invention, a method and apparatus are provided for migrating existing embedded PBX hardware and software elements into a PC, giving rise to a fully functional PC-based PBX. The PC-based PBX according to the present invention incorporates a main fiber control card for providing real time services including message and circuit switching add fiber-based peripheral connectivity for supporting voice and signaling information between the PC-based PBX and one or more existing peripherals. A hardware abstraction layer is added over the existing call control software for enabling such software to operate in the PC environment, instead of the traditional proprietary PBX environment. According to the preferred embodiment of the invention, other features are provided such as an emulator running in Windows NT for executing existing PBX call control software designed to run on a non-Windows NT platform; a SCSI emulator for mapping SCSI calls from the existing PBX file system onto a Windows NT file system representing all of the existing PBX files and a digital signal processor (DSP) card for providing tone/conferencing functionality.

BRIEF INTRODUCTION TO THE DRAWINGS

A detailed description of the prior art and preferred embodiment of the present invention is provided herein below with reference to the following drawings, in which.

DETAILED DESCRIPTION OF THE PRIOR AND PREFERRED EMBODIMENT

Figure 1:
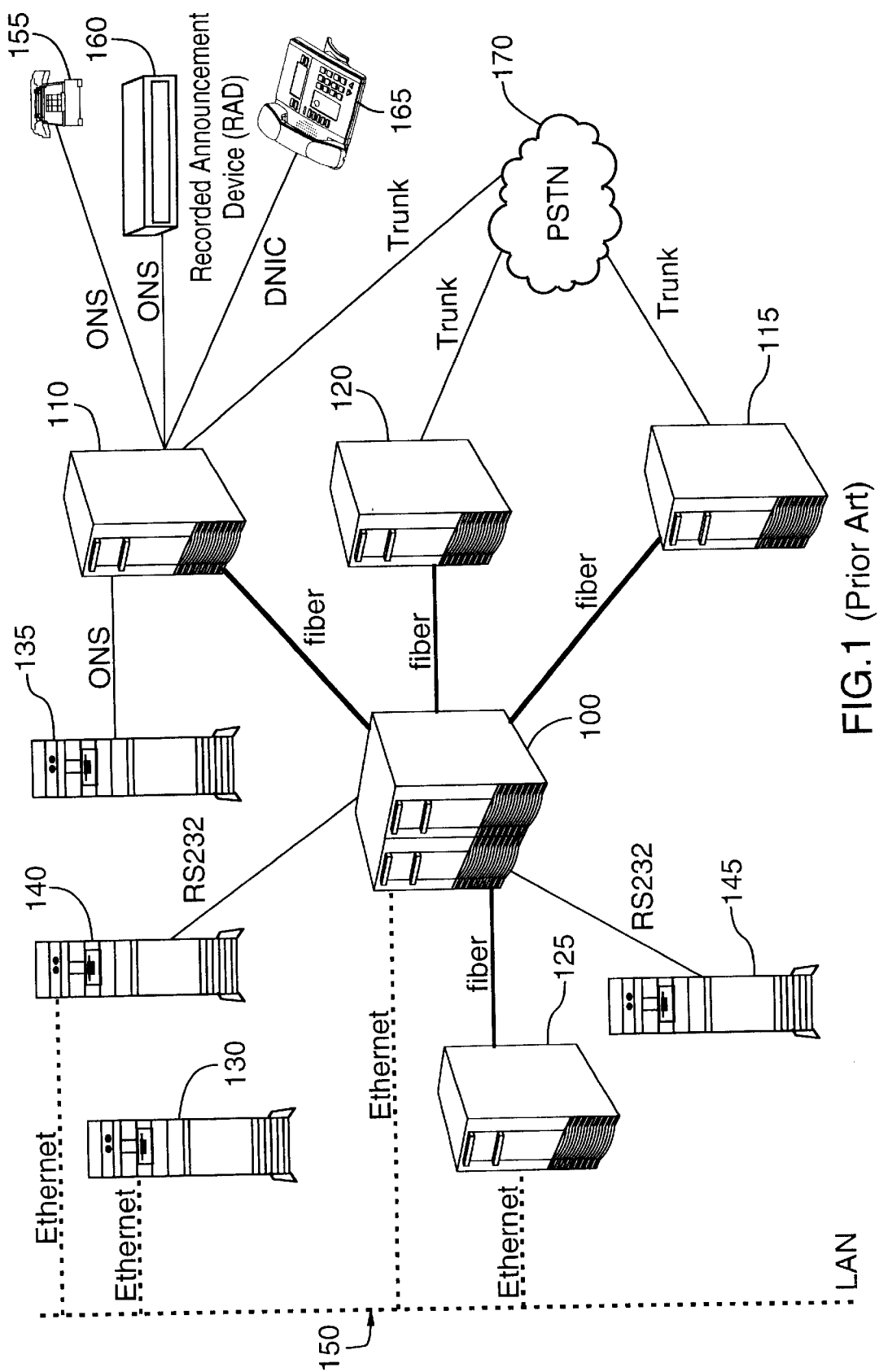
FIG. 1 shows a traditional PBX system configured with several application servers in accordance with the prior art.

Turning to FIG. 1, a traditional PBX system is illustrated according to the prior art, configured with several application servers. The illustrated PBX system comprises a main control cabinet 100 connected to a peripheral cabinet 110, digital service unit (DSU) cabinet 115, network gateway 120; applications gateway 125; network management server 130; voice mail server 135; call center management server 140 call accounting server 145. The illustrated PBX system is exemplary the prior art. A person of ordinary skill in the industry will appreciate that numerous other configurations are possible.

The main control cabinet 100 incorporates physical hardware and core PBX software implementing well known PBX call control functions. The hardware components typically include a main control card and a plurality of fiber interface modules (FIMs) which plug into a time division multiplexing DM) backplane for multiplexing voice and signaling channels over fiber links to e peripheral cabinet 110, DSU cabinet 115, network gateway 120 and applications gateway 125. The main control card (not shown) typically includes a central processor unit (CPU), TDM backplane for transporting the voice and signaling information between the FRMs and internal message and circuit switch matrices, a circuit switch matrix for providing interconnection of voice channels, a message switch matrix for providing signaling information routing between intelligent system nodes, a SCSI controller for controlling disk drive operations, one or more DSPs to provide conferencing and tone detection, RS232 ports which may be used for customer data entry, printing and providing detailed call accounting records, an Ethernet LAN interface for providing access to a corporate LAN network 150 and control resource card which contains the RS232 ports, a real time clock and a system ID EPROM which uniquely identifies each system.

The main software components which are executed within main control cabinet 100 include call control for managing all of the call features available on the PBX system, a database for storing PBX programming information in structured records, a file system for providing a means for storing and retrieving files, a customer data entry interface which is a graphical user interface (GUI) for programming the PBX system, a message switch subsystem for providing communications between intelligent nodes in the system which are connected via fiber, a circuit switch subsystem which provides services to the circuit switch matrix for switching voice channels, and maintenance software for monitoring and testing components in the PBX system.

The peripheral cabinet 110 provides line and trunk card interfaces for connecting analog telephone sets 155 and recorded announcement devices (RADs) 160 over ONS ports, digital telephone sets 165 over digital network interface circuit (DNIC) lines and the outside public switched telephone network (PSTN) via internal trunk cards. The RAD 160 provides the ability to play a prerecorded announcement in support of features such as automated attendants. The peripheral cabinet 110 also houses a peripheral processor (not shown) for supporting real time software functions such as line and trunk drivers and DSPs for DTMP reception. As indicated above, the peripheral cabinet 110 is connected to main control cabinet 100 via a fibre cable which carries both voice and signaling traffic.

The DSU cabinet 115 is connected to main control 100 via a fibre cable which carries signaling and voice traffic. The DSU 115 supports a CEPT and DS1 formatter card. The CEPT card (not shown) provides support for Digital Private Network Signaling System (DPNSS) trunk protocol and the DS1 formatter supports both DPNSS and T1/D4 signaling protocol.

Network gateway 120 provides ISDN primary rate connectivity with the PSTN over a trunk by means of a T1/E1 card (not shown). The network gateway 120 is connected to main control cabinet 100 via a fibre link for carrying signaling and voice traffic, as indicated above.

Applications gateway 125 supports computer telephony interfaces such as TAPI in order to permit third party application developers to monitor and control PBX functions within the system. The applications gateway 125 is also connected to main control cabinet 100 via a fiber connection and utilizes the Host Command Interface (HCI) to pass information to and from the PBX, as required. The applications which use the CTI interface reside in an application server (not shown) which communicates with applications gateway 125 via an Ethernet connection over LAN 150.

Network management server 130 provides applications for enhancing the management capabilities of the PBX system in a stand-alone or networked environment. The server 130 communicates with main control cabinet 100 via Ethernet LAN 150.

Voice mail server 135 is shown connected to peripheral cabinet 110 via ONS ports and provides voice mail support, in a well known manner.

Call center management server 140 is connected to main control cabinet 100 via RS232 port and also to LAN 150, and provides statistics and real time monitoring functions for call center operations using the PBX system, in a manner well known in the prior art.

Call accounting server 145 is also connected to main control cabinet 100 via an RS323 line and provides detailed call accounting of all calls processed by the PBX system for billing purposes.

As discussed above under the heading "Background of the Invention", and as further exemplified by the above description having regard to FIG. 1, traditional prior art PBX systems are configured in a complex manner which contributes to expense having regard to the number of PC platforms required and result in a closed environment for application development.

Figure 2:
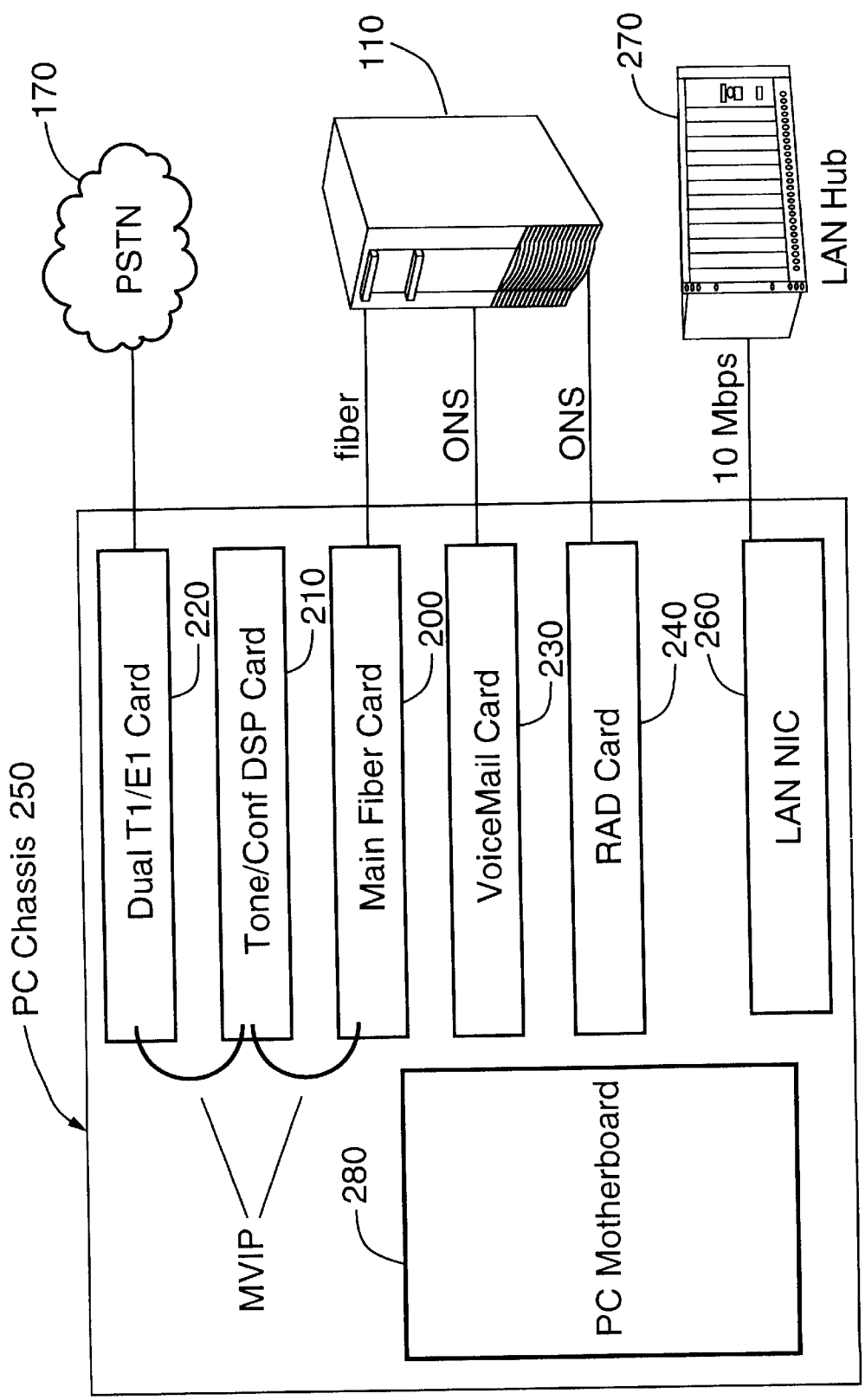
FIG. 2 is a block diagram of the hardware components of a PC-based PBX according to a preferred embodiment of the present invention.

Turning to FIG. 2, a hardware block diagram is provided of a PC-based PBX according to the preferred embodiment, comprising a main fiber control card (MFC) 200, tone and conference card 210, dual T1/E1 card 220, voice mail card 230 and RAD card 240 mounted within a PC chassis 250. In addition, a LAN NIC 260 is provided for communicating with LAN hub 270, and PC motherboard 280 and other conventional hardware such as disk drives, CD ROMs, I/O ports, etc. (not shown).

The MFC 200 is used to support real time services including a message switching system and circuit switching system, discussed in greater detail below. The MFC card 200 also provides a fiber interface module (FIM) which permits connectivity to a peripheral cabinet 110 via a fiber cable for transporting both voice and signaling information. The MFC card 200 incorporates a Multi-Vendor Integration Protocol (MVIP) bus connector which is used to transport voice channels from the E1 or T1 digital trunk 220 and tone conference card 210 to the MFC card 200 where such channels are circuit switched to provide communication. The MFC 200 replaces the circuit and message switch functionality provided in the main control card of cabinet 100 in the prior art PBX system of FIG. 1.

Tone/conference DSP card 210 provides tone detection, tone generation and conferencing functionality and replaces the functions provided by the DSPs on the main control card of control cabinet 100 in the prior art PBX system of FIG. 1. The tone/conference DSP 210 also includes an MVIP bus connector which is used to transport DSP channels to the MFC 200 where channel switching is performed.

The dual T1/E1 card 220 is used to provide digital trunk connectivity to the PSTN 170 or to other PBXs (not shown) which may be connected together to form a private network. The MVIP bus is used to transport channels to the MFC 200 where the trunk channels are circuit switched. Various protocols are capable of running on the T1/E1 card 220, including DPNSS, T1/D4, PRI ISDN trunk protocols.

Voice mail card 230 provides ONS ports which are connected to the ONS cards in the peripheral cabinet 110. The ONS circuits transport voice mail recordings to and from the card 230.

The RAD card 240 also provides ONS ports which are connected to ONS circuits in the peripheral 110. These circuits are used to play recorded greetings to callers, typically used in auto attendant applications.

Figure 3A:
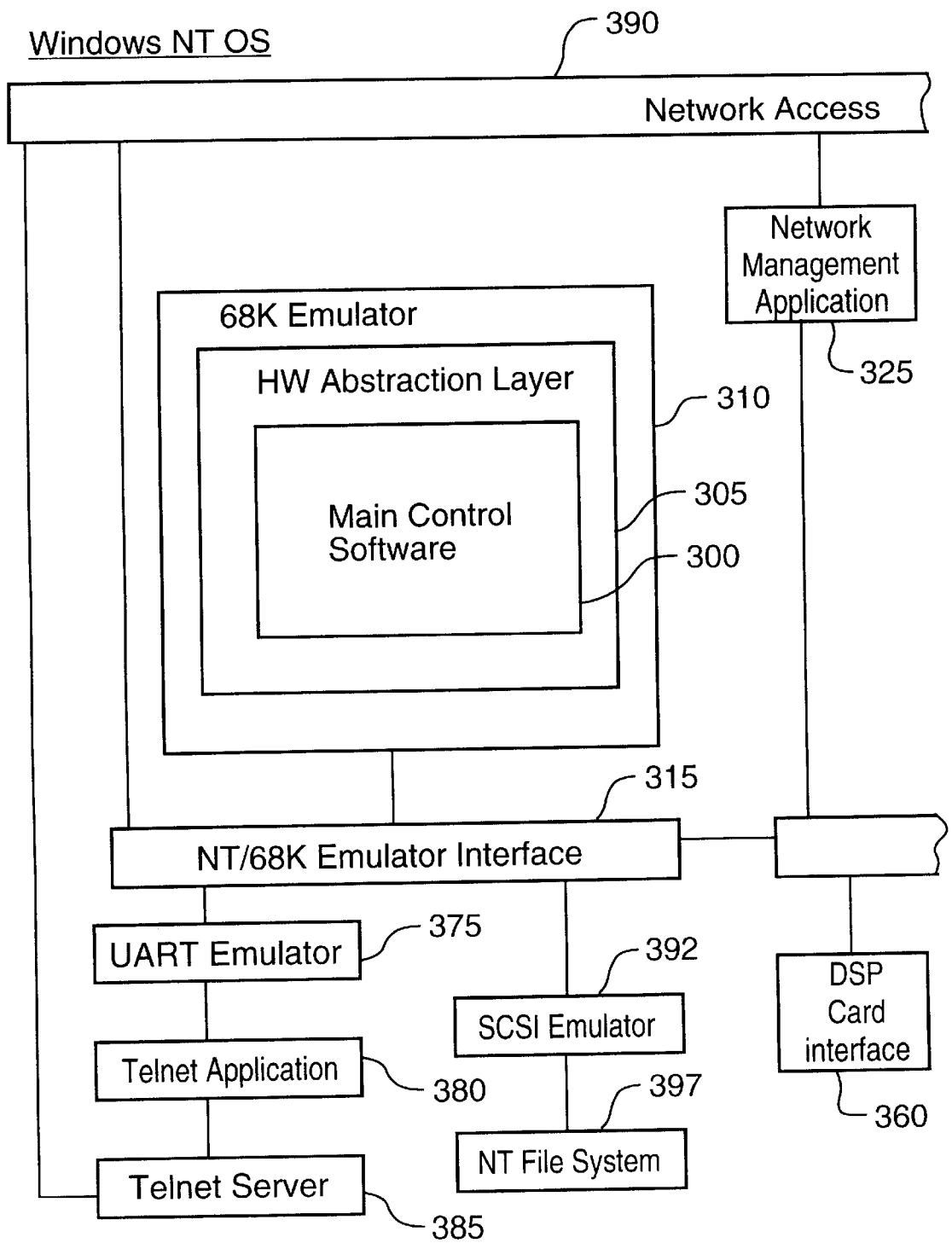
FIG. 3 is a block diagram showing software components of the PC-based PBX of FIG. 2.
Figure 3B:
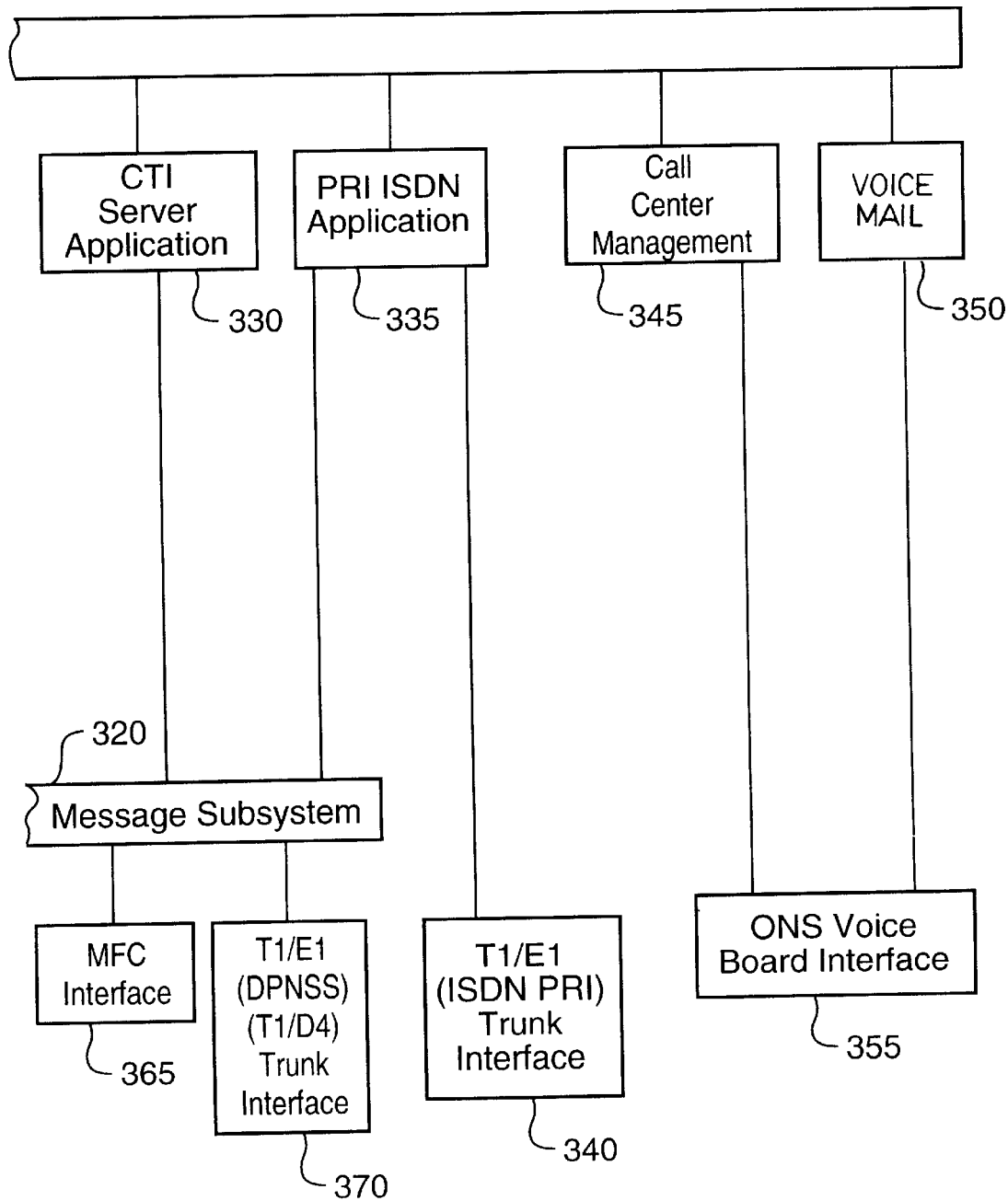
Figure 4:
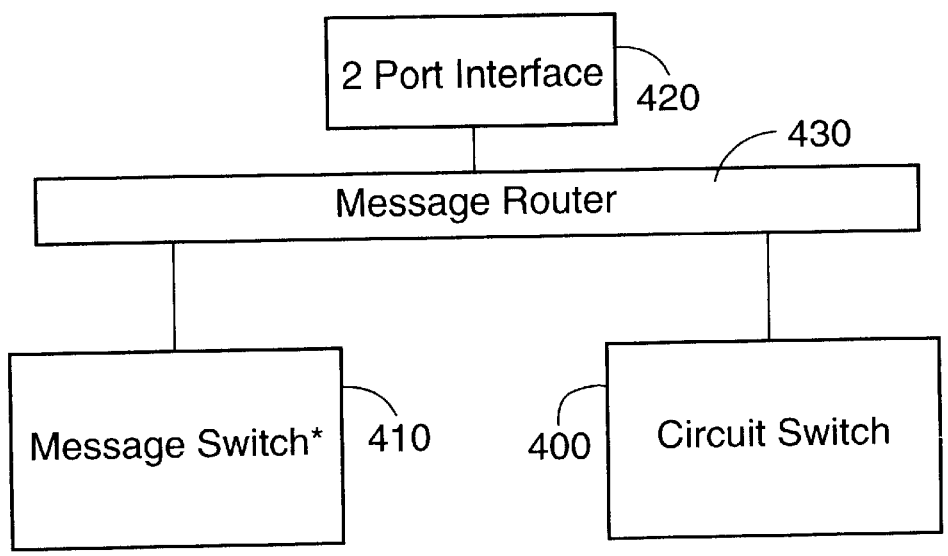
FIG. 4 is a block diagram showing the software architecture of a main fiber card of the PC-based PBX according to the preferred embodiment.

With reference to FIG. 3, the software architecture according to the present invention is set forth in detail.

As discussed above with reference to FIG. 1, the main call control software is executed within a main controller 100 for providing call control, database, file system, customer date entry, message switch subsystem, circuit switch subsystem and maintenance. According to the present invention, this identical software, identified as 300 in FIG. 3, is implemented in a Windows NT environment. In order to migrate the main control software 300 from a non-Window NT environment to the NT-based PC platform of the present invention, a hardware abstraction layer 305 is incorporated to provide hardware registers and system responses and behaviors expected by the software 300 in its traditional PBX environment. The hardware abstraction layer 305 according to the present invention minimizes the changes required to the main control software 300 in order to implement the software in a Windows NT operating system.

A 68 K emulator 310 is also provided which behaves exactly as a 68000 microprocessor (Motorola) and allows the main control software 300 to run in its native 68000 binary code. This guarantees that the functions provided by the main control software 300 behave on the PC platform in an identical way as in the native PBX environment.

A NT/68 K emulator interface 315 provides a means for communicating between the NT operating system and the McKemel operating system running under the 68 K emulator 310, as described in greater detail below.

A messaging subsystem 320 is provided which replaces the functionality of the prior art message switching system in the PBX of FIG. 1, and provides greater flexibility in permitting inter-thread and inter-process communications than is possible according to the messaging system in the prior art PBX of FIG. 1. Nonetheless, the message subsystem 320 maintains the same message format and addressing scheme as the message switching system implemented in the main control cabinet 100 of FIG. 1.

Network management application 325 communicates with the main control software 300 via message subsystem 320 for controlling communications with an enterprise LAN 390, as discussed in greater detail below.

Similarly, CTI server application 330 communicates with the main control software 300 via message subsystem 320 for interfacing with additional CTI applications, as discussed in greater detail below.

The PRI ISDN application 335 also communicates with main control software 300 via message subsystem 320 for controlling the dual T1/E1 card 220 via T1/E1 (ISDN PRI) trunk interface 340.

Call center management application 345 is a third party application (in the preferred embodiment a pair of application from Taske Technology entitled "Call Center Management Tools" and "Call Casting") for streaming SMDR records and real time ACD reports. Similarly, voice mail application 350 is a third party application which runs under the Window NT operating system (in the preferred embodiment, a system created by Applied Voice Technology entitled "Call-Xpress"). Both the call center management 345 and voice mail 350 applications communicate with voice mail card 230 and RAD card 240 via an ONS voice board interface 355.

DSP card interface 360 provides a communication interface to the tone/conference DSP card 210 and MFC interface 365 provides a communication interface to the MFC card 200.

The implementation of DPNSS and T1/D4 trunk protocols according to the present invention is via porting the existing DSU software from the CEPT and T1 cards of the prior art PBX (FIG. 1) and running them on the PC ISA based dual T1/E1 card 220. Because the card 220 is PC-based, trunk interface 370 is required for communicating with the trunk card via a NT driver.

UART emulator 375 is used to re-direct the stream of UART characters generated by UART drivers in the main control software 300 (for providing VT100 terminal access for debugging and management applications) to a Telnet server 385 via application 380 to allow for remote access to the main control software 300 via a local area network (i.e. by means of LAN NIC 260).

The file system for the prior art main control software 300 support a SCSI disk drive. In order to port the main control software 300 to a PC environment, a SCSI emulator 393 is utilized for mapping SCSI calls from the file system of the main control software 300 onto a flat NT file system 397 representing all of the files within main control software 300.

A successful prototype of the present invention is described hereinafter with reference to FIGS. 4–14, and which is based on prior art SX2000 call processing PBX manufactured by the assignee of the present application, The SX2000 main control software is designed to operate on a Motorola 68000 platform and to communicate with various hardware devices, in a configuration such as shown in FIG. 1.

As discussed above, the main fibre control card 200 performs two major functions; circuit switching and message switching. In order to perform as a PBX, MFC card 200 incorporates a 16×16 circuit switch matrix 400. In order to communicate with peripheral cabinet 110, the PC-based PBX of the present invention incorporates a message switch 410. A two port interface 420 handles messages past over the ISA bus of PC chassis 250 from the message subsystem 320. A message router 430 is provided for sorting and re-directing messages received by MEC card 200 to the intended processor application. According to the present invention, messages can be directed to message switch 410, circuit switch 400 or peripheral cabinet 110.

As discussed above, the message switch 410 is responsible for supporting the prior art message link protocol within main control software 300 with the peripheral cabinet 110. The message switch 410 is also responsible for downloading, assigning a controller number and informing the main control software of the current status of the peripheral message link.

An important aspect of the present invention is the design of the 68 K emulator 310 for processing programs written for the Motorola 68000 processor on the Intel 80×86 microprocessor platform of the preferred embodiment, and in order to re-use existing call processing code (i.e. main control software 300) on the Windows NT platform.

Figure 5:
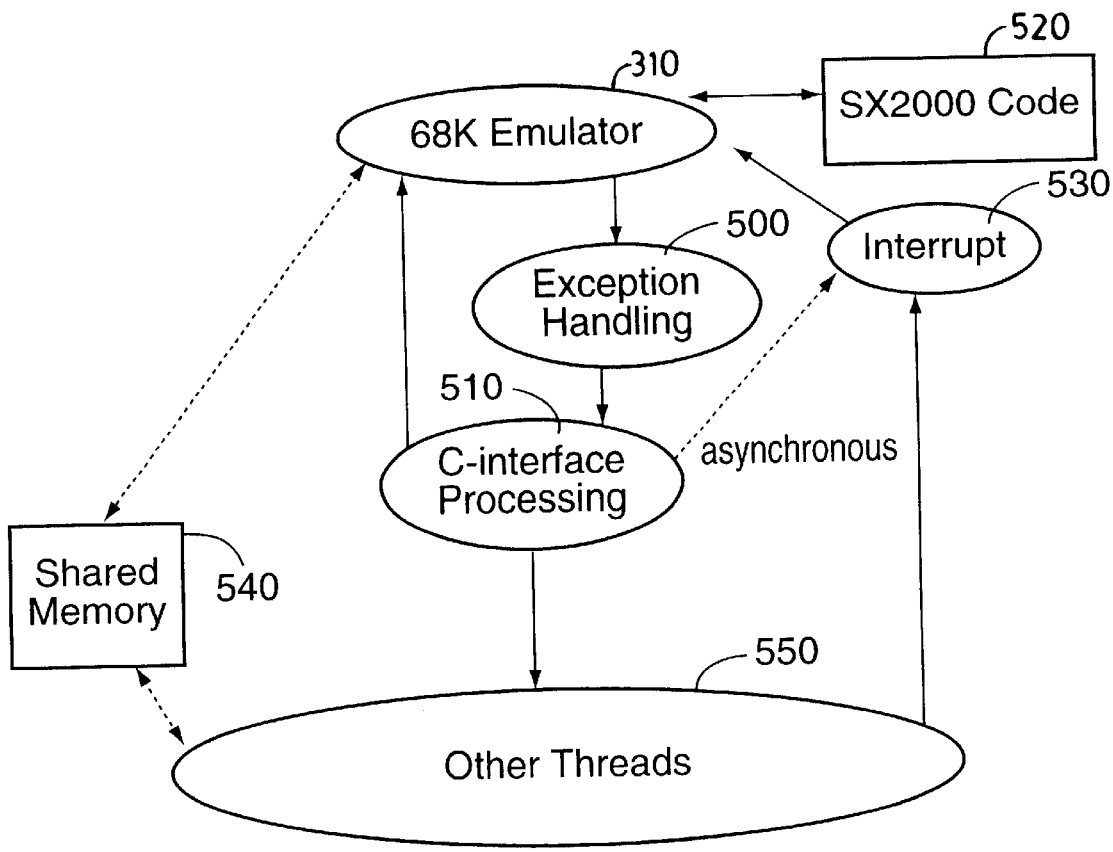
FIG. 5 is a high level diagram of a 68 K emulator forming one of the software components depicted in FIG. 3.

FIG. 5 shows the main subdivisions and interactions between the 68 K emulator 310 according the preferred embodiment.

The six main subdivisions are: the 68 k Emulator 310, Exception handler 500, C-Interface 510, (synchronous and asynchronous), SX2000 code 520, Interrupt handler 530, and a shared memory 540.

During the start-up sequence of the Emulator 310, the SX2000 code 520 is loaded from file and stored into memory 540. The reserved memory includes sufficient space for the system main memory, extension DRAM, an EPROM load and space for shared memory and hardware connections. The space is contiguous from the point of view of the 2000 code 520. The memory may not be physically contiguous, but Windows NT performs the background work to ensure that the virtual memory space seen by the Emulator 310 does appear and behaves as a contiguous section. The SX2000 run file is stored using an S-record format. This format specifies where within the memory each section of the load is to be located. The record (or records where one is provided for main load, one for the EPROM, etc.) is read directly as a file.

The main function of the Emulator 310 is to take existing SX2000 code 520 (which is designed to take advantage of the Motorola 68000 processor architecture and is thus very tightly coupled to this architecture) and run it on an Intel 80×86 platform. Due to the different processor structure (register structure, instruction set, etc.) each 68 k instruction is translated into and emulated by a series of 80×86instructions. The emulating code is arranged in a large table indexed by the 16-bit 68 k instruction code. This creates a table with approximately 47 thousand entries each between 5 and 50 lines. A total of 65 thousand are available but some correspond to invalid bit patterns not used by Motorola as of the time of filing this patent application. In order to run a program, the 68 k Emulator 310 takes each 68 k instruction (read from memory), refers to the table to find the emulating code (series of instructions) and performs the emulation code. The 68 k Emulator 310 and the instructions are written in 80×86 assembly language to maximize efficiency/speed. Once an instruction has been processed, the Emulator 310 automatically executes the subsequent instruction. This process continues indefinitely unless exception handling 500 requires an interrupt to be processed.

Exceptions (software and interrupts) are handled within the assembly loop of the 68 k Emulator 310. These consist of either hardware interrupts (set externally as discussed below) or software exceptions (the SX2000 code 520 relics on the handlers contained therewithin, such as those for supporting Low Level Debugger functionality-LLD). Exceptions can be triggered externally in order to trace the execution flow or triggered internally to indicate that external processing is required.

The C-interface 510 assets in the transition between emulated processing and native processing. When a "C" function (native function written outside the emulated 68 k environment) must be executed, a special exception ("Exit Emulator") is triggered from within the Emulator 310 (coded in the SX2000 code 520). The exception shifts the flow of execution outside the 68 k Emulator 310 where the exception handler 500 determines what type of exception has occurred. In the case of an error condition, corrective actions are taken. For an "Exit Emulator" exception, the enumerated function type to be executed is retrieved (saved in a special register by the SX2000 function requesting the exception) and the appropriate function is started. The functions arc enumerated identically in the "C" and 68 k environments (starting from a single file) in order to guarantee that the correct function is executed.

The selected function can be either synchronous or asynchronous in nature. For synchronous functions, control is retained by the function until its completion, at which time control is returned (along with any calculated/collected data) to the 68 k Emulator 310. Asynchronous functions (such as lengthy input/output) spawn a separate thread 550 in the NT environment, within which processing continues, and immediately returns control to the 68 k Emulator 310.

Within the SX2000 code, McKemal (i.e. the operating system/scheduler) blocks the process (removed from the ready queue) and continues execution with other processes. It should be noted that there are two pre-emptive, priority-based operating systems processing simultaneously one within the other—McKemel inside a Windows NT thread. When completed, the spawned thread sets an interrupt and places any return data in shared memory 540. Processing of the interrupt by the 68 k Emulator 310 causes McKemel to retrieve the data and return the blocked process to the ready queue. The C-interface 510 and interrupt handler 530 routines allow the SX2000 code 520 to communicate with code executing native to NT.

A crucial aspect of the Emulator 310 is the distribution of functionality within threads and the scheduling priority of each. CPU resources are required to be shared amongst various applications (i.e., the many threads required by the PC-based PBX and other processes also residing on the NT platform (such as the CTI Server Application 330). it is anticipated that, initially, the Main Control Software 300 will require approximately 70% of total CPU resources, with the remaining 30% to be used for all other applications (e.g. Network Management Application 325, CTI Server Application 330, etc.).

The Main Control Software 300, and consequently also the Emulator 310, perform time-critical tasks and thus are scheduled at regular time intervals. Timing is provided by multimedia-timers (not shown), with resolution available up to 1 ms. Scheduling is designed to meet the criteria listed below:

Should McKemal enter its Idle loop, the CPU resources will be given up for other threads within the Main Control Software 300 (i.e. the event triggers the primary tasks to suspend the 68 k emulator's thread execution).

Should the Main Control Software 300 complete its task prior to the expiry of its allotted time, the process relinquishes any remaining resources to other processes.

Should other applications exhaust their need for CPU resources prior to the completion of their allotted time, the resources are offered to the Main Control Software 300.

Within the system, the Emulator 310 is accorded the highest priority with the following exceptions: the interrupt thread 530 must be able to interject information within the Emulator 310, and the timer functionality must perform in real-time.

As discussed above, emulator program 310 operates to replace each 68000 instruction with a set of Intel instructions which perform an identical task and support Motorola-like registers. According to another aspect of the invention, the forty-five thousand routines are prepared automatically by a Generator program, as described in co-pending application Ser. No. 2236640, filed Nov. 4, 1999, and entitled "Emulation System Including Emulator Generator".

Although the 68 K Emulator 310 provides full emulation of the Motorola 68000 chip, the PC-based PBX of the present invention does not provide any of the actual hardware that the SX2000 code 520 normally expects to interface with. Therefore, as discussed briefly above, a hardware (HW) Abstraction layer 305 is provided for emulating the missing hardware, and for stubbing (i.e. providing identical functionality with a different interface, while keeping as similar as possible an interface to the existing code), so as to perform the same functionality in software, without emulating details of the hardware. For example, the LLD output of characters to a CRT screen is done on the system of FIG. 1 through a UART. Rather than emulate the UART protocol of transferring characters, the HW Abstraction layer 305 outputs the character directly to a window, using the standard method of printing characters to the screen. The portion of the SX2000 code 520 that manipulates the hardware in question is removed. Specifically, the interface between the Emulator 310 and the C code 520 is called from the assembler file, and the function is then implemented in C code. The principal advantage to this method is the speed increase obtained by replacing a slow and frequently inefficient hardware emulation of assembler device driver code with native C code, completed for the native platform.

In order to execute the code 520 on the Motorola 68000 emulator 310, it is necessary to adopt the memory map for the system to be emulated. This map is overlaid with several C structures on the Windows NT platform to make the interface with the emulated SX2000 from C as simple as possible.

Some of the hardware abstractions of the components are implemented are as follows:

Sanity Timer

The sanity timer is used throughout the code 520 and for this reason is kept in the implementation of the Call Server architecture according to the invention. This hardware is emulated, and thus no changes are required to any code that deals with this timer.

Programmable Timer

The programmable timers are used most notably by McKemel for the scheduling of tasks and other operating system functions. These timers must be provided for the operation of the SX2000 Call Server. Windows NT provides several multimedia timers that have millisecond resolution that are suitable for this task.

Real Time Clock

The real time clock is used in various application on the Call Server, including the time stamping of files. The system clock of the PC is used to implement any returns from calls to the Real Time Clock.

EPROM Chip

The EPROM is implemented using a segment of the main memory array of the emulator 310.

Main Memory

As discussed above, the main memory is implemented as an array residing in the memory space of the emulator process.

SX2000 Registers

Registers such as the Interrupt Cause Register and the Status Register are implemented for compatibility with the existing SX2000 code 520, and arc placed in fixed locations at the end of the main memory array. To change the locations of the hardware registers, changes have been made to the hardware address tables used by the SX2000.

Figure 6:
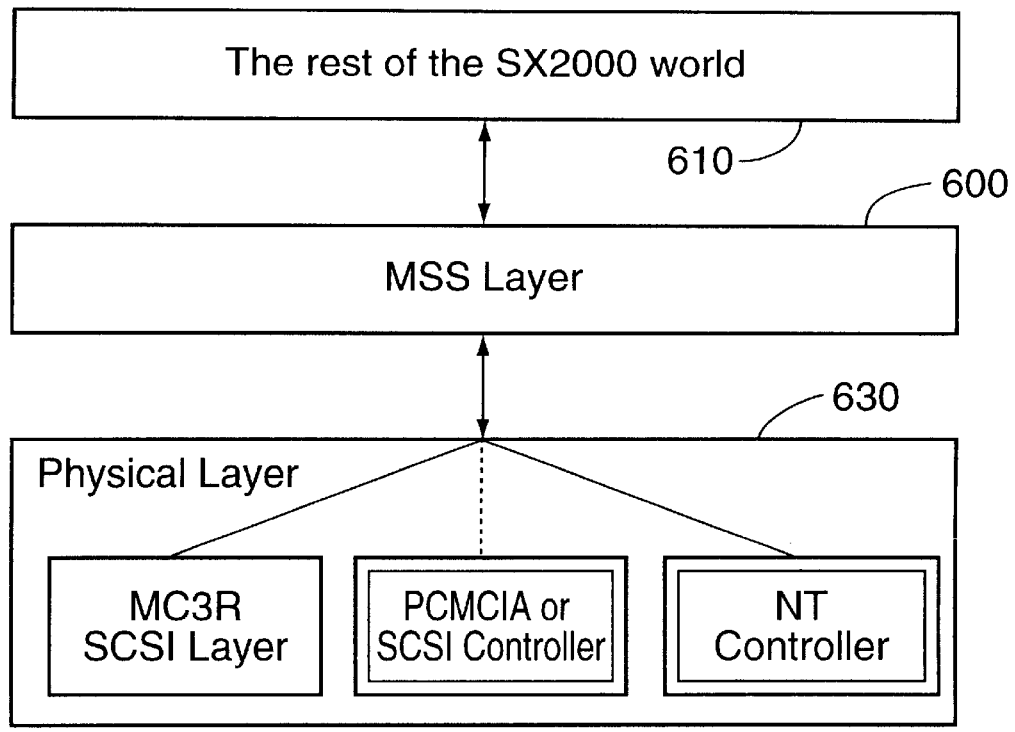
FIG. 6 represents the main software blocks and interfaces utilized in a SCSI emulator forming one of the software components depicted in FIG. 3.

The SCSI hardware on the prior art PBX of FIG. 1 is controlled by the Physical Layer driver. The driver receives the SCSI requests from Mass Storage Subsystem (MSS Layer 600) that communicates with many SX2000 components represented by "The rest of the world" 610. The main software blocks and interfaces are illustrated in FIG. 6. The SCSI emulator 392 is accomplished by redirecting SCSI requests issued by MSS Layer 600 (to the Physical Layer 630) to the NT environment. Two modes of operation are used in the SX2000 system (polling based and interrupt based). Accordingly, two sets of functions are emulated.

In addition to requests mapping, a platform conversion (Intel—Motorola) takes place for each parameter passed between the environments.

Figure 7:
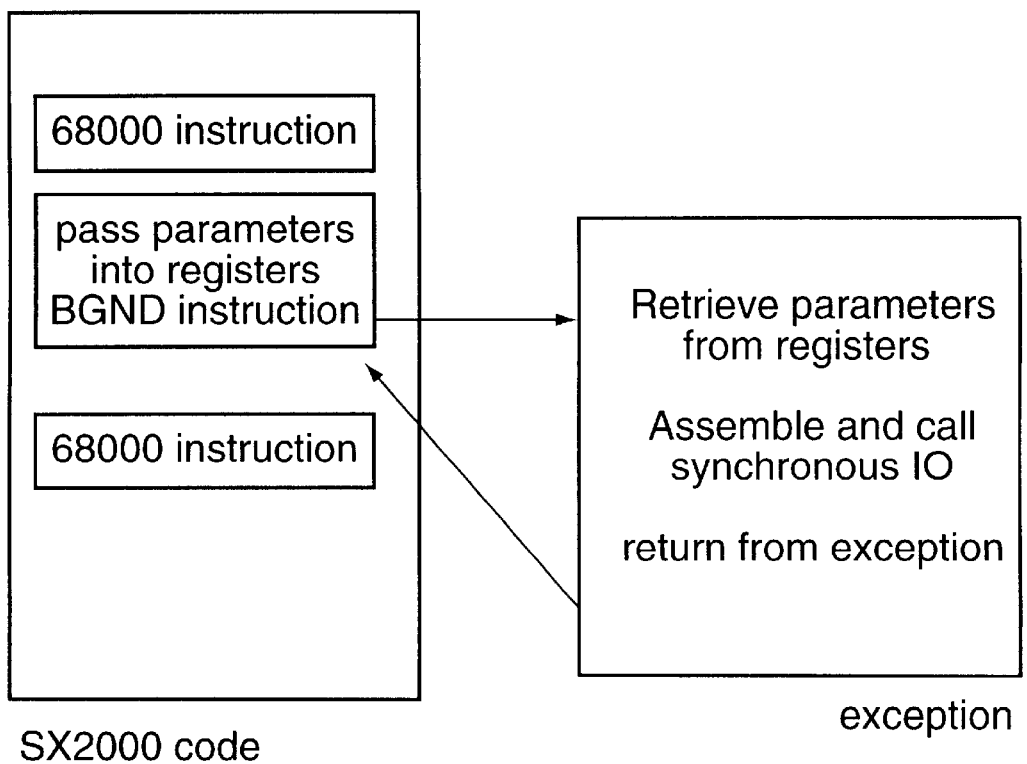
FIG. 7 is a diagrammatic representation of a polling mode of operation for the SCSI emulator of FIG. 6.

The initialization of the SX2000 system uses polling mode, where the requested operation has to be completed before the SX2000 system resumes execution with the next machine instruction, as illustrated in FIG. 7.

Each synchronous I/O request is replaced by a function, which passes parameters to registers and then generates an exception. The exception carries-out the request. Once the I/O is completed, the return status is passed back to SX2000 code 520. The execution continues with the next instruction within the same SX2000 task.

Figure 8:
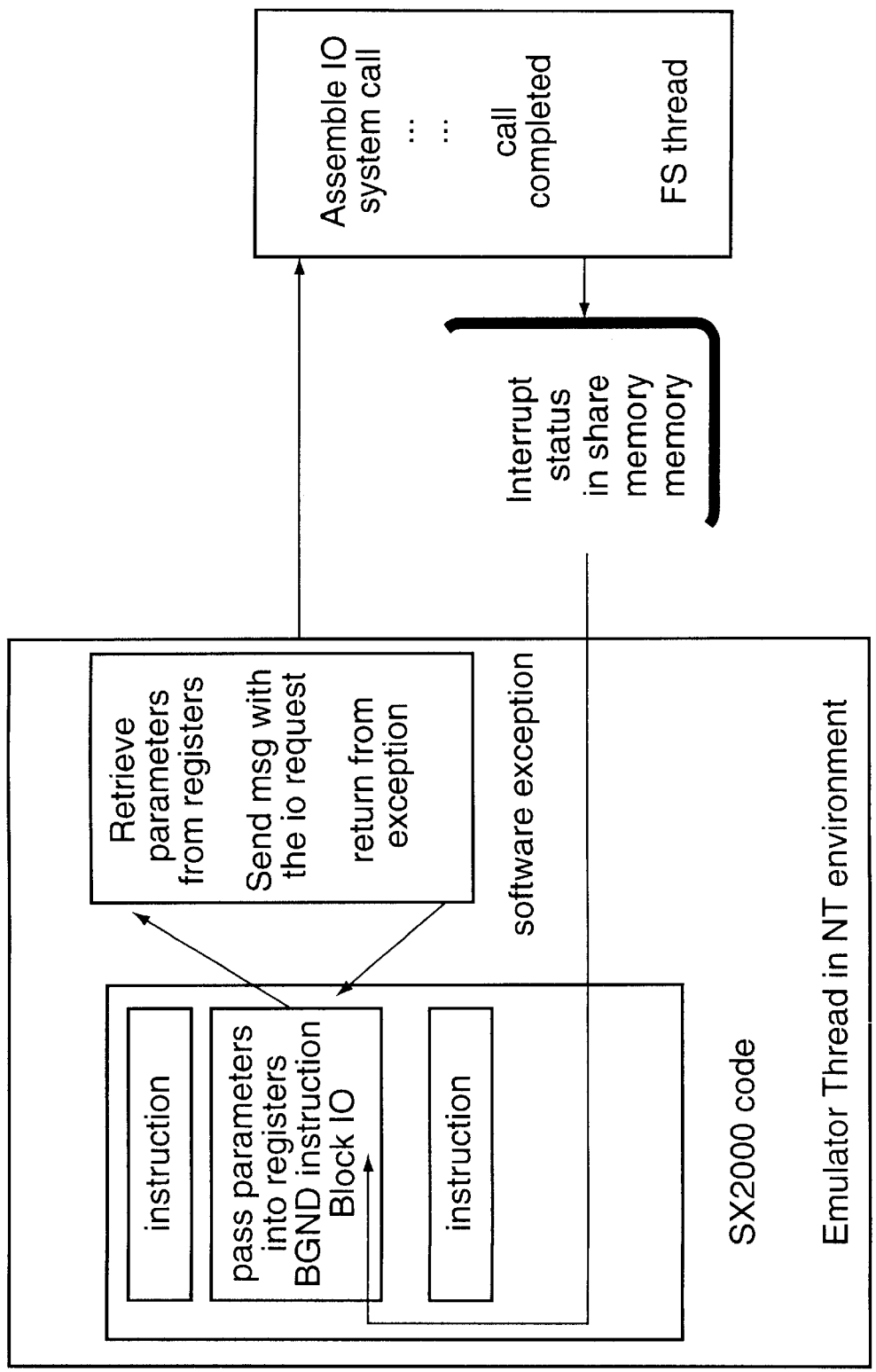
FIG. 8 is a diagrammatic representation of an interrupt mode of operation for the SCSI emulator of FIG. 6.

During normal operation (i.e. multiprocessing) interrupt mode is utilized, such that the SX2000 task initiates an operation and suspends itself until the operation is completed. Once the requested I/O is completed, the suspended SX2000 task is resumed as illustrated in FIG. 8.

Each asynchronous I/O request is replaced by a function which passes parameters to registers and generates an exception. The exception passes the request to the I/O thread and returns. The current SX2000 task is suspended. Once the I/O is completed in the NT environment, the I/O thread sets the interrupt status in the shared memory. The emulator reads the interrupt status and if set, resumes the suspended task.

Figure 9:
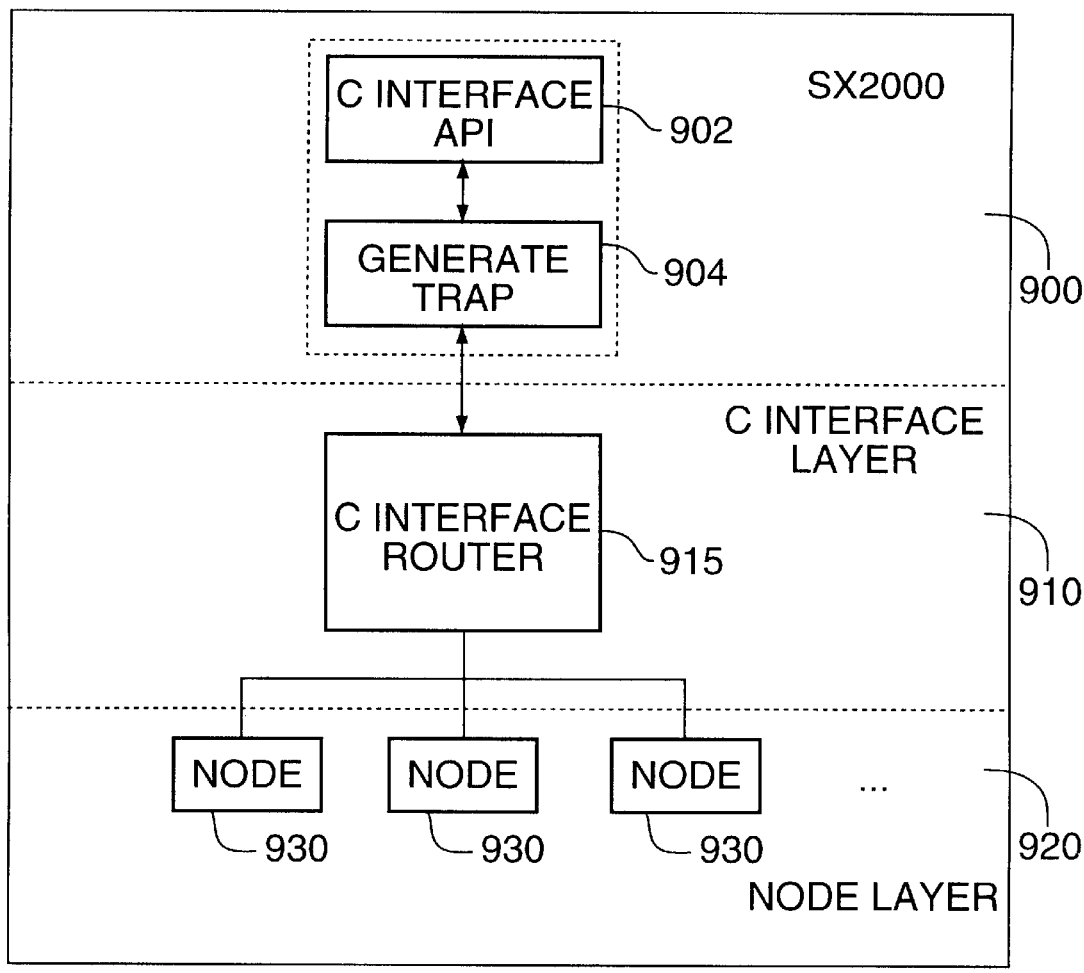
FIG. 9 is a diagrammatic representation of three distinctive layers which define a C interface architecture for effecting a Windows NT-to-emulator interface according to the present invention.

As FIG. 9 depicts, there are three distinctive layers defined in the C Interface architecture. The SX2000 layer 900 includes C Interface API 902 and Generator Trap 904, which define the entry point to the C Interface from the SX2000 code space 520. The C Interface Layer 910 which contains a token router 915 which determines which entity to pass a token to and the Node Layer 920 which contains developer entities (nodes) which handle user defined C Interface tokens (CTIs). According to the preferred embodiment, functionality is grouped into individual nodes 930 rather than being spread across nodes. For example, all file system functions are grouped in a file system node with sub-node routing information being provided within the payload of the CIT, rather than in the CIT header.

The C interface architecture of FIG. 9 represents a "one-way function" in the sense that tokens are conceptually sent and retrieved from the SX2000 code space 520. A developer interfaces with the C Interface from the SX2000 space 520 using standard C Interface APIs 902. The CI APIs 902 generate a TRAP to switch the Windows NT space for the purpose of passing the pointer to a CIT defined in SX2000 space 520 to code in the Windows NT space. The TRAP handler 904 takes the pointer to the CIT and converts it into the Windows NT memory pointer equivalent and passes the new pointer to the C Interface Router 915, thereby passing the token. The C Interface Router 915 then examines the header to determine which node 930 should receive the token. To use the C Interface, developers must provide a user defined token in the SX2000 memory space and export three functions from the created node 930 which handles the token. The three functions are classified as initialization, de-initialization, and token passing functions.

The system of the present invention facilitates DX message passing between the existing SX2000 software 300 running in the 68 k emulator environment 310 and NT threads (see FIG. 5) as well as legacy SX2000 peripheral nodes 110. On the SX2000 side, the existing SX2000 DX message system interface provides various DX message delivery services that are reused in order to ensure stability of the existing SX2000 software. On the NT side, the same DX message delivery services are provided to NT threads so that the NT threads communicate with SX2000 processes correctly through the DX messages. The DX message delivery services on the NT side are provided through a set of message system APIs, discussed in greater detail below.

The Legacy SX2000 message passing services for McKernel applications are as follows:
1. Regular Message passing is via a 32 byte DX message. In the SX2000 message system, functions such as Send, Send_ Reply, Receive_ Any, Receive_ Specific, Receive_ Reply are used to pass regular messages.
2. Long Message passing is via a long message of 120 bytes. Send_ Long and Receive_ Long are used to pass long messages.
3. Super long message passing is via a super long message set to 403 bytes. Super send_ long and Super_ Receive_ Long are used to pass super long messages.

Figure 10A:
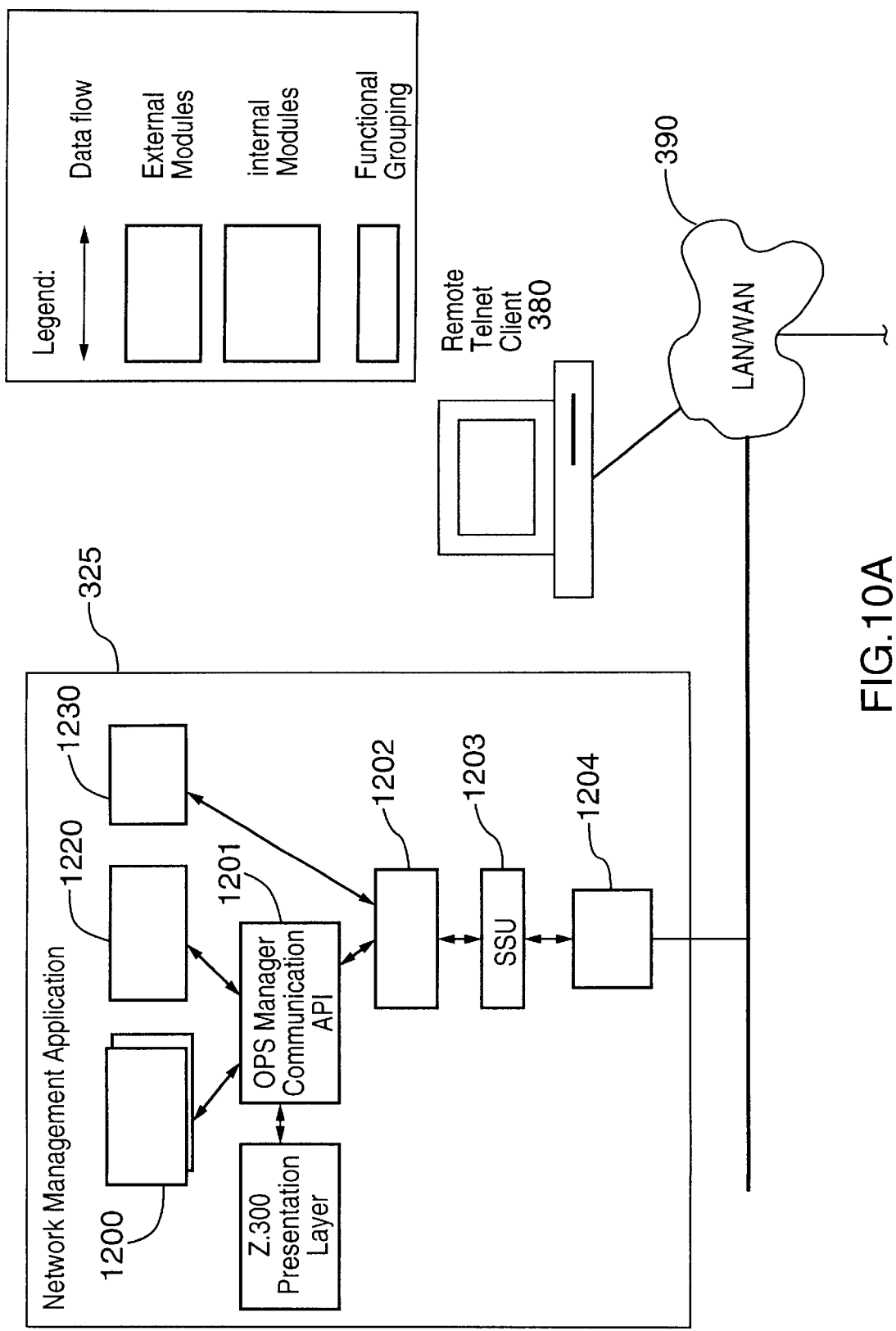
FIG. 10 is a schematic illustration of voice/LAN management communication according to the preferred embodiment.
Figure 10B:
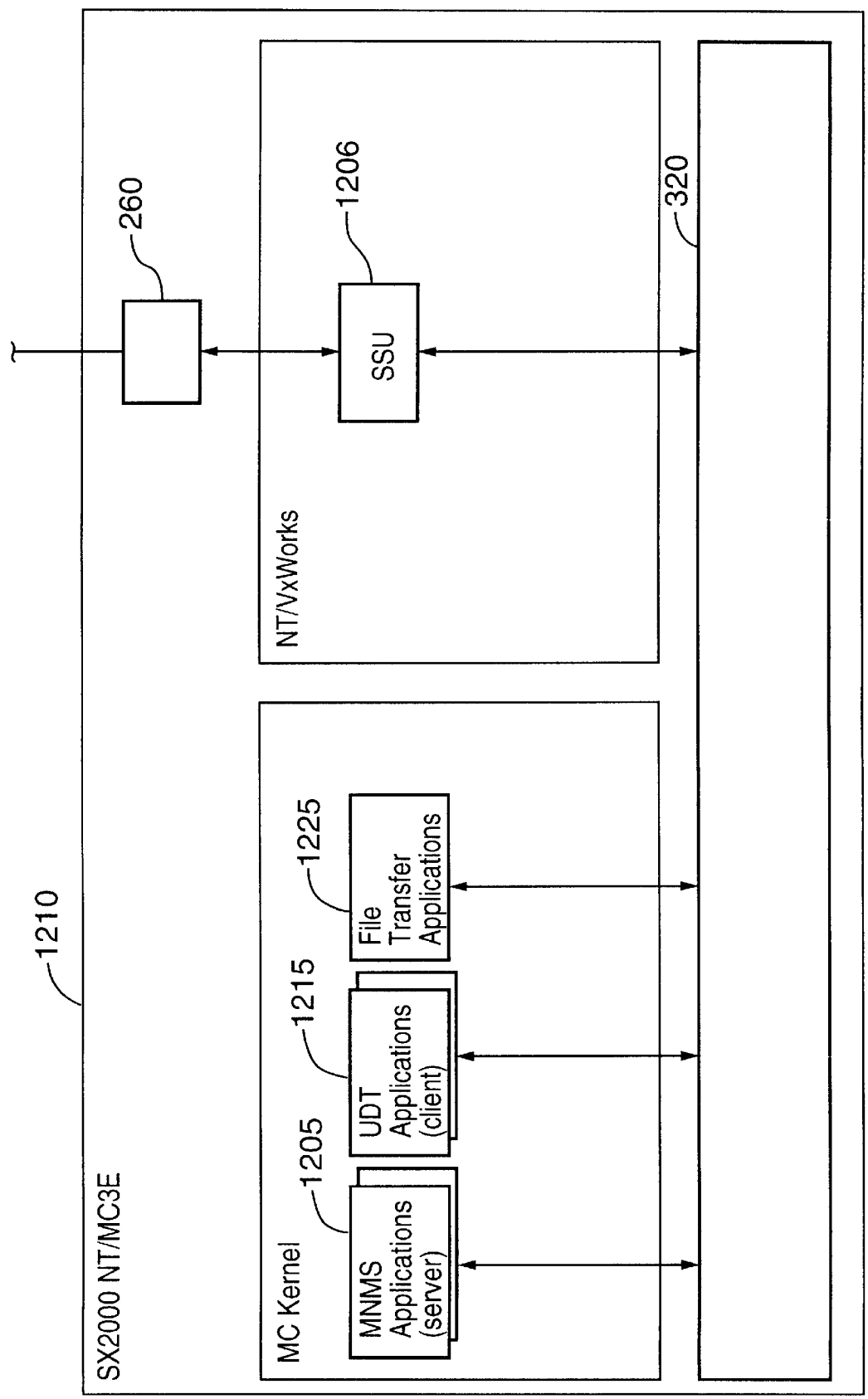

The Main Control Software 300 communicates with the Network Management Application 325 using the message mechanism provided by the Message Subsystem 320. FIG. 10 provides a high level view of the communication software residing in the PC-based PBX of the present invention and its interaction with Network Management Application 325.

The MNMS Communications facility provides a mechanism for client applications 1200 on the Network Management Application 325 to exchange network management information with a server application 1205 on remote Call Server 1210. There can be several instances of the MNMS Communications facility (or the MNMS pipe), since the Network Management Application 325 can maintain concurrent connections to several different Network Elements. Each pipe can be switched by the applications to the Network Element of their choice. The pipe also permits shared usage, so that a number of Network Management applications 325 can concurrently communicate over the pipe to respective peer applications on the PABX. The communication is carried over a reliable TCP/IP socket connection between the Network Management station and its peer Call Server via an OPS Manager Communication API 1201, message system 1202, Simple Socket Utility 1203 (SSU) and Ethernet Port 1204, on the Network Management side. On the Call Server side, communication is carried out via Ethernet Port 260, SSU 1206 and Message System 320.

The UDT Communications facility (or UDT pipe) allows client applications 1215 on the remote Call Server 1210 to send event indication to a server application 1220 on the Network Management Application 325. The connection is set-up on demand when a client application on the Call Server needs to send an event indication to its peer application on the Network Management Application. Just like the MNMS pipe, the UDT pipe communication is carried over a reliable TCP/IP socket connection.

The Telnet facility provides remote access to a maintenance port on the remote Call Server 1210. This service allows any Telnet client application 380 to connect to either the maintenance or debug terminal. Shared usage is also permitted on this pipe.

The File Transfer facility provides a mechanism for applications 1225 on the remote Call Server 1210 to upload and download a single or multiple files to/from an FTP Server 1230 on the Network Management Application 325. This service utilizes the well known FTP protocol.

Figure 11:
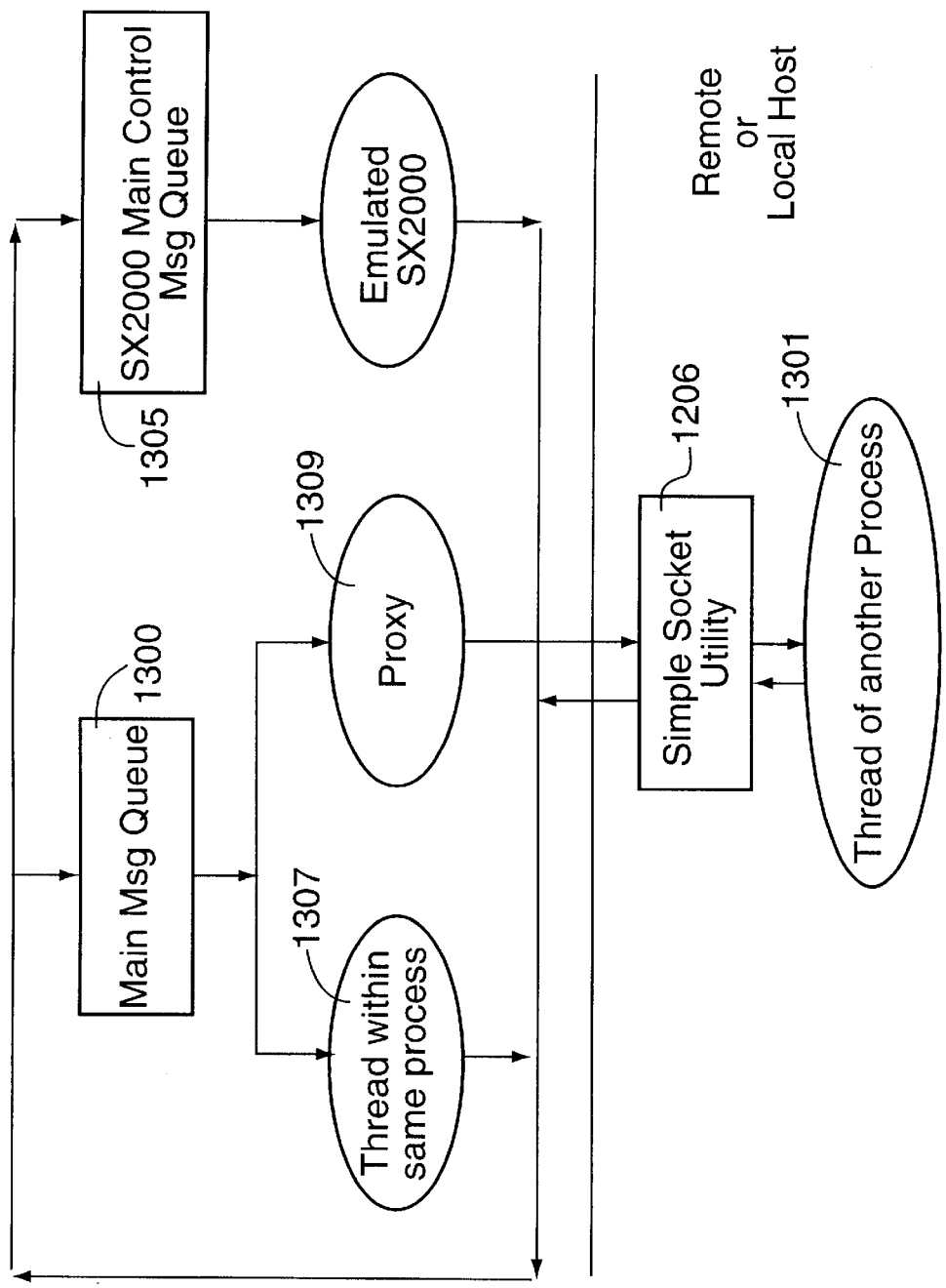
FIG. 11 is a diagrammatic representation of a message subsystem according the preferred embodiment.

The Message Subsystem 320 is shown in greater detail with the reference to FIG. 11. Applications are required to register with the Message Subsystem. During registration, the Message Subsystem allocates message queues for each thread 1307. If the thread is not local to the Message Subsystem process (i.e. Proxy 1309), then the SSU 1206 is used to establish a socket connection between two processes 1301 and 1309. When messages are sent, the Message Subsystem 320 queues the message onto the Main Queue 1300 or the SX2000 Queue 1305 depending on the destination. The Message Subsystem then sorts the messages and delivers them to the Application's queue.

DSP Services for the PC-based PBX of the present invention are provided by a PCI DSP card 210 which provides DSP resources and local switching capability. The DSP card 210 provides the following resources to the PBX: tone generation, tone detection, conferencing, and DTMF receivers. The Card 210 provides local switching to the MVIP bus and supports up to four DSP/ASIC pairs.

A DSP device driver 360 is provided which follows the set of standards defined for generic device driver in the Windows NT environment.

In order to manage the DSP resources provided from the PCI DSP card 210, a number of modules are required. The are the DSP API layer 1400, the DSP resource manager 1402, the DSP manager 1404, the Tone Supervisor 1406, the Cadence Manager 1408, the DSP class driver 1410 and the DSP driver 1412.

Figure 12A:
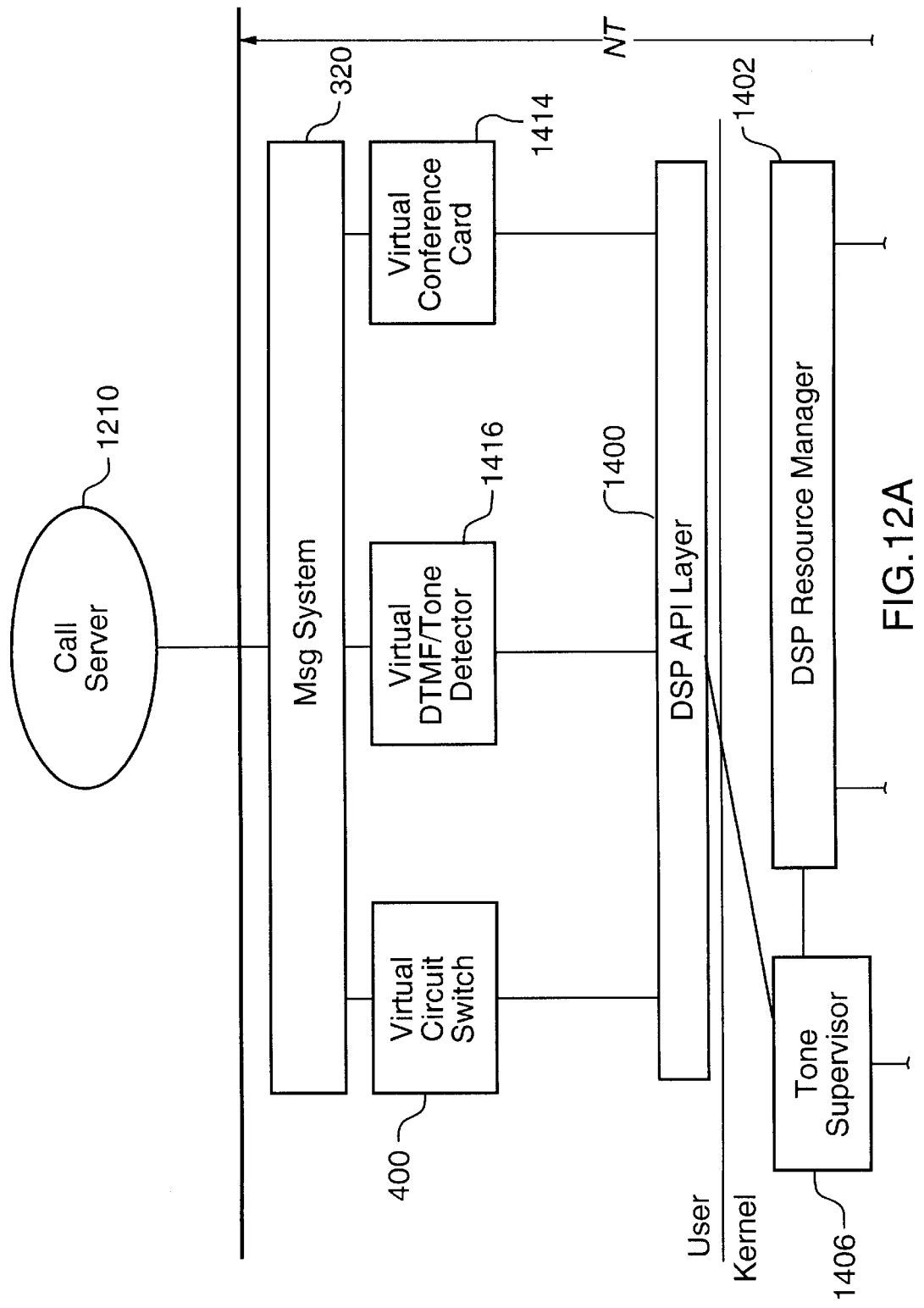
FIG. 12 is a block diagram showing a hardware and software architecture for a tone/conference DSP service according to the preferred embodiment.
Figure 12B:
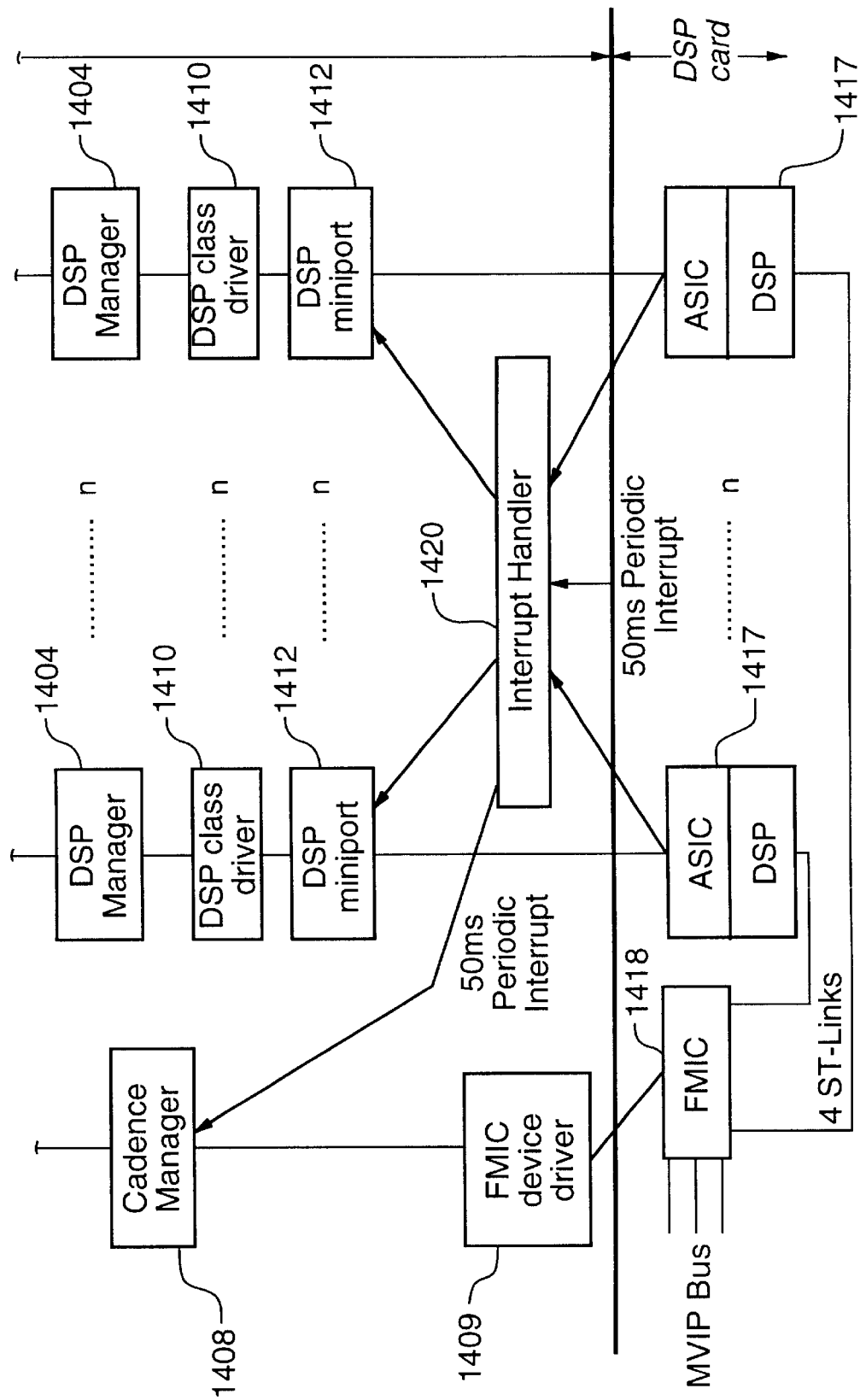
Figure 13:
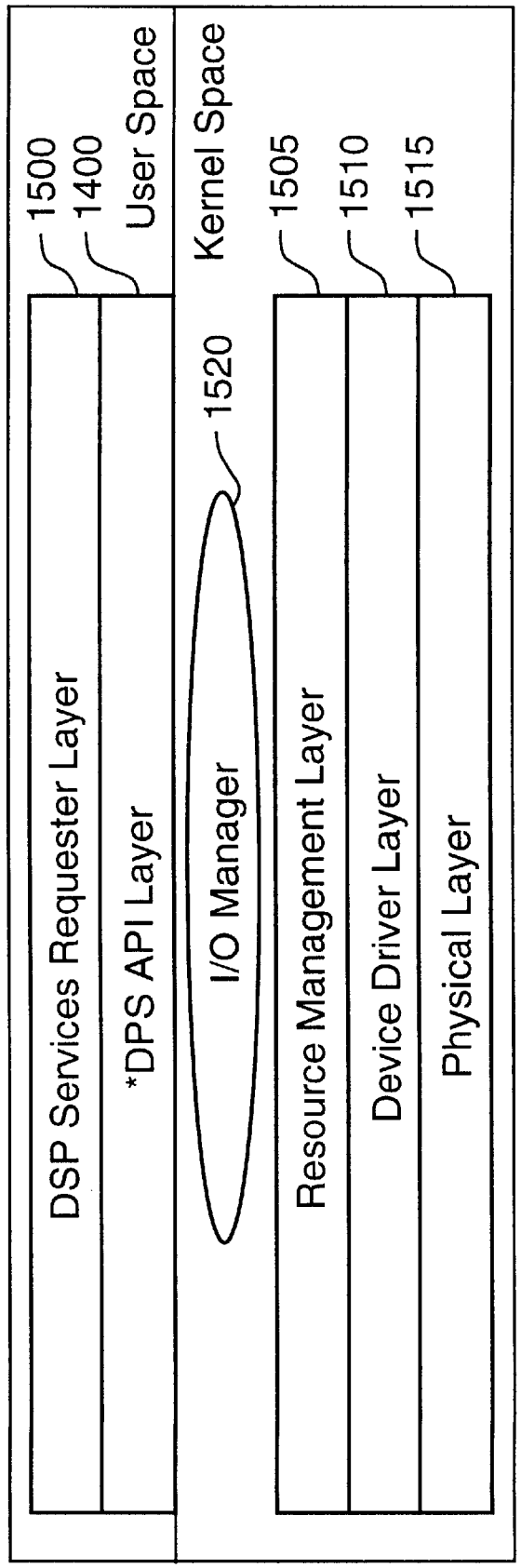
FIG. 13 illustrates a layer model for the tone and conference service of FIG. 12.

The DSP/Conference architecture of FIG. 12 can also be represented by a layer model with five different layers as shown in FIG. 13: the DSP service requester layer 1500, the DSP API layer 1400, the resource management layer 1505, the device driver layer 1510 and the physical layer 1515. The DSP service requester layer 1500 is composed of all of the clients to the DSP services. The DSP API layer 1400 receive all of the requests from the DSP service requester layer 1500 and dispatched them to the resource management layer 1505. The device driver layer 1510 is the layer which interacts directly with the physical devices. The physical layer 1515 defines the physical devices on the PCI DSP card 210. The I/O Manager 1520, which is part of Window NT, is included in the layer model of FIG. 13 for completeness.

The client to the DSP services requires no knowledge of anything below the SP API layer 1400. Therefore, any changes to the layers below the API layer arc encapsulated from the client from the client of the DSP services which greatly enhances the robustness of the DSP algorithms. The device driver layer 1510 conforms to the Windows NT driver model.

A virtual conference card 1414 exists as part of the message system. Its function is to support the conference DSU message interface and translate it for the conference DSP (one of DSPs 1417). In the PC-based PBX of the preferred embodiment, the conference function is handled by the PCI DSP card 210. All conference requested are forwarded via the message system 320 to the DSP Manager 1404 which is responsible for managing all DSP resources.

A virtual ATD card 1416 is provided as part of the message system. Its function is to support the ATD DSU message interface and translate it for the tone detector DSP (one of DSPs 1417) In the PC-based PBX of the preferred embodiment, the tone detector function is handled by the PCI DSP card 210. All DTMF/tone detector requests are forwarded to the DSP Manager 1404 which is responsible for managing all DSP resources.

The DSP API layer 1400 provides an abstraction layer to the DSP services. This layer collects all of the tone or resource requests and forwards them to the tone supervisor 1406 or the resource manager 1402, respectively. The resource requests are divided into two categories: requests for DSP resources and requests to control an FMIC chip 1418 on the PCI DSP card 210. The purpose of the DSP API layer 1400 is to encapsulate all hardware specific information from the resource requester. Therefore, any application can utilize the DSP card 210 by simply interacting with the appropriate API. This feature greatly enhances the portability of the DSP card 210.

The tone supervisor 1406 is responsible for handling all tone requests forwarded from the API layer 1400. During system initializing, the tone supervisor checks for any pure tones that are to be generated permanently on the broadcast channels. The supervisor 1406 then requests all of these pure tones from the DSP 210. The frequency of the pure tones and the ST-Link channels on which these pure tones are generated are stored in the table inside the tone supervisor 1406. When a tone request is received at a later time, the tone supervisor 1406 traverses the table to locate the ST-Link channel on which the pure tone component is generated. The tone supervisor 1406 is also responsible for instructing the cadence manager 1408 to produce cadenced tone on a given channel. The tone cadence is done by connecting and disconnecting a given channel on the MVIP bus to one of the pure tone channels on one of the four ST-Links according to a given tone plan. The connection and disconnection of channels is done via the EMIC 1418 on the DSP card 210, via a FMIC device driver 1409.

The cadence manager 1408 is designed to manage the cadence of tone. The cadence of tone is accomplished through the enabling and disabling of a tone in a given channel by connecting and disconnecting that given channel to the tone channel. As described above, the four ST-Links which contain the tone channels are connected to the MVIP bus on the PCI DSP card 210 via the FMIC 1418. Therefore, the connection between the tone channel and the MVIP bus channel within the FMIC is constructed and broken repeatedly, to provide tone cadence on a given MVIP bus channel. In order to construct and break a connection within the FMIC 1418, the cadence manager 1408 sends a connect/disconnect message to the FMIC device driver 1409, The cadence manager 1408 bases the cadence timing on a periodic hardware interrupt every 50 ms. Whenever this periodic interrupt occurs, the interrupt handler 1420 wakes up the cadence manager 1408, to perform tone cadence on a channel that is the cadence queue. When there are no more tone cadences to be performed, the cadence manager masks off this periodic interrupt until a new tone cadence request is received. The thread priority of the cadence manager 1408 is set to the highest possible level to assure critical timing in tone cadence.

The DSP resource manager 1402 contains information on the availability of all of the DSP resources on the PCI DSP card 210. During card initialization, the resource manager 1402 creates all instances of DSP manager 1404 required to manage all of the DSPs on the PCI DSP card 210 according to the resource table. The number of DSP manager instances 1404 required is defined in the resource table within the resource manager 1402. The resource table lays out all of the available resources from every DSP manager 1404. When a resource request is received from the API layer 1400, the resource manager 1402 utilizes the resource table to determine which instance of DSP manager 1404 should respond to the received request. The resource manager 1402 then sends a request to the DSP manager. When the request is granted, the resource manager 1402 removes that resource from the available resource in the resource table for the corresponding DSP manager instance 1404 until the resource is relinquished. The use of resource requests between the resource manager 1402 and the DSP manager 1404 gives flexibility in terms of dynamic resource allocation. Therefore, if one DSP manager 1404 rejects the resource request, the resource manager 1402 traverses the resource table to request service from the next DSP manager 1404 in line. The DSP resource manager 1402 resides in the kernel space of the Window NT environment to avoid frequent communication through an I.O manager.

Each instance of the DSP manager 1404 is responsible for managing the use of a single DSP 1417. During initialization of the DSP, the manager 1404 defines what kind and how many resources are available from the DSP. Then the DSP manager 1404 manages the resource status on the DSP. The status of the DSP itself is also managed by the DSP manager. Whenever the status of the DSP changes, the DSP driver 1412 informs the DSP manager 1404. A request for DSP resource is granted based on both the status of the DSP resources and the status of the DSP itself. The DSP manager 1404 exists as a message driver thread, which wakes up only when a resource request is received from the DSP resource manager resource 1402 or when a message is received from the device driver as a response to resource request or to inform the DSP manager about changes in the DSP. The DSP manager 1404 also gets downloaded with the definitions for all call progress tones during initialization. All communications to the DSP device driver 1412 are done through the DSP manager 1404.

The DSP class driver 1410 is responsible for all generic functionality and intelligence in the DSP device driver. Some of the class driver's functions involve message communication with the DSP manager 1404 and the miniport driver 1412 and message interpretation. Whenever there is a change of status in a DSP 1417 (i.e. from READY to OVERRUN), the DSP generates an interrupt to the interrupt handler 1420 which in turn notifies the DSP device driver 1412 and class driver 1410. The driver interprets the information from the interrupt and generates an appropriate message to inform the DSP manager 1404 about this status change in the DSP 1417.

The DS miniport driver 1412 is responsible for handling activities specific to the DSP chip and ASIC 1417 used on the PCI DSP card 210. Some of these activities involve reading and writing to the PCI bus registers, etc. The miniport driver is used to encapsulate hardware changes to the class device driver 1410.

The purpose of the FMIC device driver 1409 is to control the FMIC chip 1418 to connect and disconnect channels on the ST-links to those on the MVIP bus.

The interrupt handler 1420 responds to all interrupts from the DSP card 210. These interrupts can be generated from the ASIC 1417 or the FMIC 1418. Although there is more than one component on the DSP card 210 that is capable of generating to interrupts, all of the interrupts derive from the same interrupt line. A status register is provided which contains a value for indicating where the interrupt is originated. When the interrupt handler 1420 receives an interrupt form the DSP card 210, the handler evaluates the value in the status register and determines the appropriate module to be brought in to service the interrupt.

Figure 14:
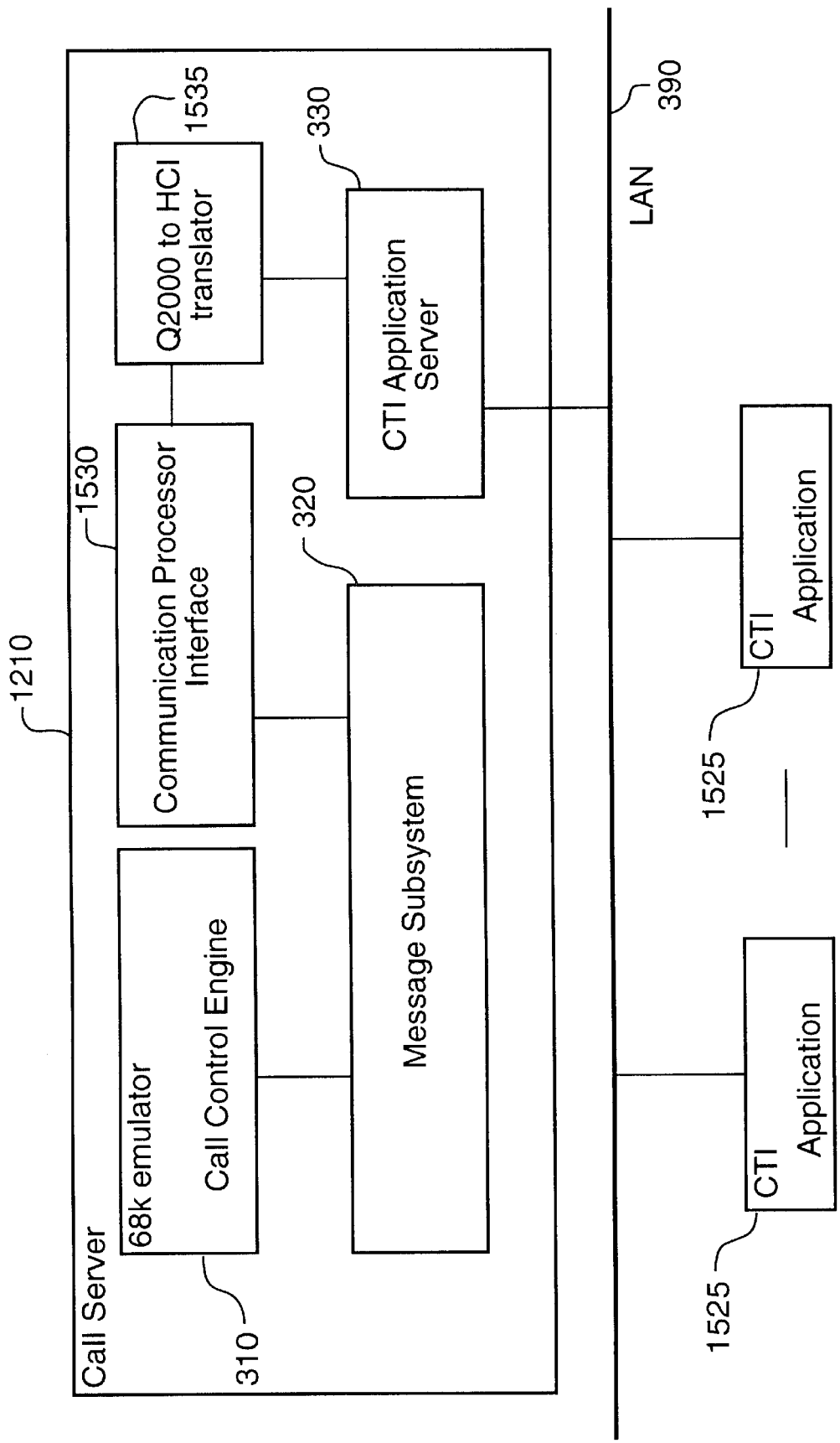
FIG. 14 is a diagrammatic representation of connectivity between the call control engine of the 68K emulator and one or more CTI server applications according to the preferred embodiment.

The connectivity between the Call Control Engine 310 and CTI Applications 1525 is facilitated by CTI Application Server 330, Communication Processor 1530 and Message Subsystem 320, as shown in FIG. 14. After the communication is established between communicating components, the CTI Application Server 330 accepts requests from the Client Application 1525 and informs them about the state of issued requests. The HCI protocol is used to communicate between CTI Application Server 330 and the Call Control Engine 310. A key component is the Q2000 to HCI protocol translator 1535.

The CTI Application Server 330 uses a pipe to communicate with the Communication Processor 1530, and a socket to communicate to its client applications 1525. Application 1525 has to link with a library in order to receive access to the CTI Application Server 330.

In summary, according to the present invention, a PC-based PBX is provided which utilizes existing call control software which is adapted to function in a Windows NT environment by use of a hardware abstraction layer and 68 k emulator. The system according to the present invention provides enhanced flexibility in terms of third party application development while voiding the necessity to recreate robust call control and feature functionality software.

Alternative embodiments in variations of the invention arc possible. For example, it is contemplated that the MVIP Bus may be utilized to transport voice for the RAD card 240 and voice mail card 230, thereby eliminating the need for ONS lines. Additional modifications and variations are possible within the sphere and scope of the present invention as defined by the claims appended hereto.

What is claimed is:

1. A PC-based PBX incorporating pre-existing call control software designed to operate in a computing environment which is not PC-based, said PC-based PBX comprising:
    a PC chassis;
    a PC motherboard within said chassis;
    a main PBX control card within said chassis for executing said pre-existing call control software;
    a telecommunications card within said chassis and connected to said PBX main control card for implementing telephony communications with a public switched telephone network under control of said call control software; and
    a DSP card within said chassis and connected to said PBX main control card for implementing signaling and conferencing functions network under control of said call control software.

2. The PC-based PBX according to claim 1, wherein said main PBX control card includes a hardware abstraction layer of software for replacing, emulating and stubbing hardware elements which are absent from said PC-based PBX and which said pre-existing call control software is designed to interact with.

3. The PC-based PBX according to claim 1, wherein said main PBX control card includes a processor emulation layer of software for emulating said computing environment which said pre-existing call control software is designed to operate in.

4. The PC-based PBX according to claim 1, further comprising a LAN card and network management software for connection to a local area network.

5. The PC-based PBX according to claim 1, further comprising a voice mail card within said chassis for implementing voice mail features under control of said call control software.

6. The PC-based PBX according to claim 1, further comprising a recorded announcement device card within said chassis for implementing voice announcement features under control of said call control software.

7. The PC-based PBX according to claim 1, wherein said main PBX control card, telecommunications card and DSP card communicate over an MVIP bus.

* * * * *

UNITED STATES PATENT AND TRADEMARK OFFICE
CERTIFICATE OF CORRECTION

PATENT NO. : 6,366,656 B1 Page 1 of 1
DATED : April 2, 2002
INVENTOR(S) : Gordon Lee et al.

It is certified that error appears in the above-identified patent and that said Letters Patent is hereby corrected as shown below:

<u>Column 15,</u>
Lines 20 through 32, claim 1 should read:
-- 1. A PC-based PBX incorporating pre-existing call control
software designed to operate in a computing environment
which is not PC-based, said PC-based PBX comprising:
    a PC chassis;
    a PC motherboard within said chassis;
    a main PBX control card within said chassis for executing
        said pre-existing call control software;
    a telecommunications card within said chassis and con-
        nected to said PBX main control card for implementing
        telephony communications with a public switched tele-
        phone network under control of said call control soft-
        ware; and
    a DSP card within said chassis and connected to said PBX
        main control card for implementing signaling and con-
        ferencing functions under control of said call
        control software. --

Signed and Sealed this

Thirtieth Day of September, 2003

JAMES E. ROGAN
*Director of the United States Patent and Trademark Office*